United States Patent [19]
Kreuter

[11] 4,032,667
[45] June 28, 1977

[54] METHOD FOR COATING CONFECTIONERY ARTICLES WITH CHOCOLATE

[75] Inventor: Walter Kreuter, Norderstedt, Germany

[73] Assignee: Kreucoha AG, Zug, Switzerland

[22] Filed: May 5, 1976

[21] Appl. No.: 683,047

Related U.S. Application Data
[63] Continuation of Ser. No. 445,533, Feb. 25, 1974, abandoned.

[30] Foreign Application Priority Data
Feb. 28, 1973 Germany .......................... 2309822

[52] U.S. Cl. .................................. 426/306; 118/24; 118/602; 426/307; 426/631; 426/660; 427/420
[51] Int. Cl.² ....................... A23G 1/00; A23G 3/00
[58] Field of Search ............ 426/303, 93, 304, 103, 426/305, 631, 306, 660, 519, 307; 118/24, 600, 602; 427/420, 421, 422, 424

[56] References Cited
UNITED STATES PATENTS

| | | | |
|---|---|---|---|
| 1,586,385 | 5/1926 | Savy | 426/306 |
| 1,688,149 | 10/1929 | Massarella | 426/303 |
| 1,973,778 | 9/1934 | Price | 426/306 X |
| 2,915,024 | 12/1959 | Kruger et al. | 426/306 |
| 3,021,779 | 2/1962 | Sollich | 118/602 X |
| 3,228,357 | 1/1966 | Bruschke et al. | 426/306 X |
| 3,470,831 | 10/1969 | Drachenfels | 426/306 |
| 3,638,553 | 2/1972 | Kreuter | 426/519 |

*Primary Examiner*—Arthur L. Corbin
*Attorney, Agent, or Firm*—Beaman & Beaman

[57] ABSTRACT

Confectionery articles are coated with precrystallized, molten tempered chocolate by forcing the chocolate under pressure through a nozzle onto a veil plate to produce a downwardly descending film of chocolate under gravitational force, passing the confectionery article through said film, collecting unused chocolate and recirculating the unused chocolate through said nozzle.

5 Claims, 2 Drawing Figures

METHOD FOR COATING CONFECTIONERY ARTICLES WITH CHOCOLATE

This is a continuation of application Ser. No. 445,533, filed Feb. 25, 1974, now abandoned.

BACKGROUND TO THE INVENTION

Flowable compositions containing cocoa butter display a relatively complicated behaviour which is to be attributed to the fact that in a very narrow temperature range between about 30° and about 40° C., the cocoa butter can assume and pass through very different states of crystallisation; both the properties of the flowable composition, especially its viscosity, and the properties of the chocolate or chocolate coatings produced therefrom by cooling and setting are very greatly dependent upon the state of crystallisation present in each case. Although the processes have not yet been clarified in detail, nevertheless, on the basis of experience and the theoretical concepts available hitherto it has been possible to develop specific methods of treatment of compositions containing cocoa butter, in which it is possible to combine good processibility of the composition with favourable properties of the solidified chocolate produced therefrom, especially as regards gloss and stability against the formation of fat bloom. These preparation processes in the case of chocolate are known in the art under the name "tempering" or "pre-crystallisation". By a well-tempered chocolate composition there is to be understood relatively thin liquid composition which on cooling forms a high-gloss surface which does not tend to the formation of fat bloom in storage.

Special difficulties arise if a flow of cocoa butter-containing composition after tempering or pre-crystallisation is not caused to solidify as a whole, as is the case for example in the production of block chocolate, but only a fraction is consumed in one cycle and the remainder undergoes further cycles. In this case the quantity consumed in each cycle can be made up by the supply of a corresponding additional quantity. This process is encountered predominantly in so-called coating machines, in which any articles, for example pieces for confectionary, are coated with the composition. In this case the procedure is generally adopted whereby a many times too large flow of the composition is poured over the articles and the major part of the proportion which runs away unused is returned in the cycle for renewed use. In such applications the composition must be kept over considerable periods of time as far as possible without change in the state of crystallisation which is most favourable for working. In order to achieve the highest possible uniformity of the coatings, it is sought to keep the viscosity practically constant as far as possible over the entire working period (normally one day). In most cases the thinnest possible coatings and correspondingly low viscosities are desired, and frequently for the purpose of adjustment and regulation of the thickness of the coatings a regulatable blower is also provided. With the ordinary methods of tempering or pre-crystallisation, the viscosity cannot be kept constant over the relatively long periods of time in the desired manner; instead one observes an irreversible increase of the viscosity despite the temperature being kept constant, and it is very difficult to obtain a constantly thin coating layer by other means, for example by increasing the output of the said blower. Moreover once the composition has become thicker more unfavourable properties appear after cooling; more especially the gloss of the produced coatings deteriorates. Therefore, frequently in practice the whole composition is tempered in the cycle afresh at relatively short time intervals or even at every circulation, as a whole or at least a considerable part. Since the tempering operation itself is also quite complicated a considerable expense for procedure and apparatus is incurred.

Methods for pre-crystallisation (tempering) are also known in which it is possible to obtain compositions the viscosity of which remains constant over lengthy periods of time (if the temperature is kept constant accordingly), so that these compositions can be stored without re-tempering over lengthy periods of time. According to present day knowledge this is based on the fact that, in these methods, cocoa butter crystals are obtained in the stable, so-called $\beta$-modification, while in the methods known earlier which were based predominantly upon the principle of seeding with solid chocolate, predominantly crystals of the unstable so-called $\beta'$-modification were formed. It has appeared that with the use of the described compositions of constant viscosity a considerably longer and more trouble-free operation is possible even of coating apparatuses. Since however in such and other apparatuses where the composition is conducted in the cycle and used repeatedly, greatly varied influences act upon the composition, for example acceleration, retardation, reversal, contact with various materials, especially the articles to be coated, contact with air, division of the surface, etc. Even if compositions practically of constant viscosity per se are used, troubles can arise the causes of which are mostly complex and the elimination of which is accordingly difficult. However, even in the case of compositions which are tempered in accordance with older methods and accordingly have a viscosity which per se is not constant, due to the described and possibly also other influences in the cycle conducted, there is a considerable number of sources of potential troubles, so that even with these compositions, additional difficulties and variations of the viscosity can occur, the cause of which is difficult to perceive.

SUMMARY OF THE INVENTION

The present invention is based upon the problem of combating the fluctuations of the processing parameters which occur in the repeated use of flowable, cocoa butter-containing compositions and thus bringing about a better constancy and reproducibility of the results and a lower susceptibility to major troublesome influences.

For the solution of this problem, according to the invention there is provided a method for the repeated use of flowable, cocoa butter-containing compositions, especially chocolate, in which, from a current of the composition subjected to a pre-crystallisation treatment, in at least one processing stage a proportion is consumed and the remaining proportion is returned for further use in the cycle, the consumption being substantially compensated preferably by the supply of likewise pre-crystallised additional quantities, the method being characterised in that the composition is subjected briefly, at one point at least of the cycle, to a high shear gradient.

It has appeared that when the method according to the invention is used, the composition is substantially more stable in relation to chance interference influences; presumably this is to be attributed to the fact that the briefly acting high shear gradient sets the composition rheologically at every circulation into a defined initial condition which is greatly different from the rheological conditions during the other part of the circulation. The brief duration of the action is here apparently advantageous as it prevents a troublesome heating of the composition such as would be unavoidable in the case of longer action of a high shear gradient as a result of the heat of friction. The fact that flowable cocoa butter-containing compositions have thixotropic properties is doubtless also responsible for the favourable effect of the method in accordance with the invention; however, it should be expressly noted that the value of the present invention is given even without a satisfactory theoretical explanation.

For the production of a briefly acting high shear gradient, in further development of the invention, the composition can be conveyed through a constricted flow cross-section, it is obvious that this provides an especially simple execution.

The parameters of the method in accordance with the invention can easily be ascertained by a few simple experiments in every case; in further development of the invention it has generally appeared that favourable results are normally obtained when the composition is conveyed under an excess pressure of at least 1 atm. (atmosphere) and then relieved of pressure before the commencement of use in the processing stage, with generation of the temporary high shear gradient. In practice with ordinary chocolate compositions which are pre-crystallised to substantially constant viscosity, pressures of about 2 to 3 atm. exc. (excess) have proved their value. The use of the excess pressure and the relief of the composition take place in the coating of articles preferably in accordance with a development of the method in accordance with the invention in which the composition is distributed in the processing stage over a predetermined working width and is applied to an arrangement of articles to be coated with the composition and the excess running from the articles forms the remaining proportion of the composition flow which is returned in the cycle, this method being characterised in that the composition is relieved of pressure after distribution and in this relief is temporarily subjected to the high shear gradient.

This has the advantage that directly before the actual coating the composition is set into the condition regarded as favourable directly after the action of the high shear gradient. In a further development of the invention it is also possible for the composition to be distributed under excess pressure into several zones distributed around the articles to be coated, relieved with generation of the temporary high shear gradient and applied in the relieved condition to the articles.

In a further development of the invention a brief high shear stressing over practically the whole cross-section of the flowing composition shortly before the utilisation position can especially easily be effected in that the composition is relieved of pressure by squirting out of nozzles, and is then briefly subjected to a high shear gradient. It is here especially advantageous for the uniformity of the achieved coating if the jets coming from the nozzles are united into a substantially pressureless veil; this veil formation is known per se from conventional coating machines.

In the direction of the desired maintenance of reproducible and as far as possible constant crystallisation properties in further development of the invention it is advantageous if the composition is maintained in the cycle, including the processing unit, under conditions, especially temperature, by which the maintenance of the state of crystallisation obtained by pre-crystallisation is promoted. The measures will preferably include devices to maintain the processing unit and the conduits for the composition at constant temperature by means of thermostats.

As already indicated initially, the present invention offers special advantages even, and specifically, when it is used for the processing of a composition which is pre-crystallised to a viscosity which remains substantially constant with time, especially a composition which after heating to a first temperature lying above its highest melting temperature is cooled down in a first cooling stage to an intermediate temperature of about 30° to 31° C., then in a second cooling stage to a second temperature of about 20° to 29° C., and thereafter is heated without over-heating to a third temperature, the third temperature amounting to about 33° to 34° C., and in both cooling stages the composition is cooled with a cooling medium the temperature of which is only slightly lower than the final temperature of the composition in the relevant cooling stage; this method and its developments are described in U.S. Pat. No. 3,638,553.

For the carrying out of the method described, the invention further provides an apparatus for the repeated use of flowable cocoa butter-containing compositions, preferably chocolate, with a cycle for the composition and a processing unit, preferably coating unit, lying in the cycle, in which a proportion of the flow of the composition supplied in the cycle is used, where furthermore a supply device is provided for the feeding of additional quantity, compensating the consumed proportion into the cycle and devices for the maintenance of predetermined condition values, especially temperatures, for the purpose that the most extensive possible retention of the state of crystallisation of the composition can be provided, the apparatus being characterised in that in the cycle there is provided an apparatus for the generation of a high shear gradient acting briefly upon the flow of composition. In order to set the entire composition into the desired initial state at every circulation, in a further development of the invention it is expedient that the apparatus for the generation of the temporary high shear gradient is formed in such a way that it acts upon the entire flow of the composition. This is especially important in the case of an embodiment of the invention distinguished by especial simplicity, which is characterised in that the apparatus for the generation of the high shear gradient comprises a throttle device. Thus attention will be needed to ensure that the throttle device where possible comprises no zones in which partial flows can form which are only slightly influenced.

In further development of the invention the energy necessary for the flow through the constriction and for the generation of the high shear gradient can be supplied in a very simple manner in that the cycle comprises a pressure generating apparatus for the generation of a pressure difference of at least one atmosphere at the throttle device.

In the use of the invention in coating machines, special attention must be devoted to the necessary distribution over the working width of the coating machine. To this there corresponds a further possible form of embodiment of an apparatus in accordance with the invention with a processing unit formed as coating unit, where with the coating unit there is associated a carrier device, preferably forming a part of a conveyor device, for articles to be coated, especially pieces of confectionery, and with at least one distributor device provided in the vicinity of the carrier device, which distributes the supplied composition over a predetermined working width and comprises an outlet system for the delivery of the composition to the articles to be coated, the apparatus being characterised in that the distributor device comprises a distributor pressure pipe extending over the working width, a number of nozzles are provided in the pipe as an outlet system, which form the means for the generation of the temporary high shear gradient and are so dimensioned that with an excess pressure of the composition selected at at least about 1 atm. exc., preferably about 2 to 3 atm. exc., in the distributor pressure pipe a desired quantity of the composition issues from the distributor pressure pipe. In order here to avoid the formation of stagnant zones in the flow of composition, the apparatus as described is preferably formed in a manner in which nozzles are provided in the region of the ends of the distributor pressure pipe. Moreover, flow-deflecting devices opposing the formation of retarded flow zones can also be provided in the distributor pressure pipe.

After the pattern of the conventional coating machines, in the present invention it is also expedient to arrange the distributor pressure pipe above the carrier device of the articles to be coated and between the distributor pressure pipe and the articles to provide a veil plate which unites the jets of composition issuing from the nozzles into a veil flowing uniformly down onto the articles. In this embodiment only minor modifications are necessary in comparison with conventional coating machines which work for example with an inlet trough having a slotted bottom. As in the conventional veil boxes, the veil plate can also be of heatable construction, however it will frequently be possible to dispense with this measure if the entire apparatus is thermostatically governed as a whole.

In a further development of the invention it is possible to provide several distributor pressure pipes on different sides of the carrier device in order to coat the articles simultaneously from several sides. More especially a first distributor or pressure pipe can be provided above the carrier device and a second beneath it. In the case of this embodiment there is achieved an especially uniform coating with the most extensive possible approximation in design to known forms of construction in that the nozzles of the second distributor pressure pipe are permitted to open into a zone filled with composition in operation in an overflow container provided beneath the carrier device, from which the composition can be transferred by means of bottom-coating roller to the undersides of the articles. The nozzles of the second distributor pressure pipe are expediently directed downwards in the direction towards the bottom coating roller, so that the bottom coating roller is constantly well washed.

The embodiments as described, in which the processing unit is formed as a coating unit, in further development of the invention can be provided with a receiving container for the excess composition, a return conduit extending between the receiving container and the composition supply conduit, a pressure-raising device provided in the return conduit and a composition supplement conduit opening upstream of the pressure-raising device for the feed of composition into the formed cycle for the purpose of replacement of the consumed proportions of the composition.

In particular this embodiment offers the constructionally very simple possibility of permitting the supplement conduit to open into the receiving container and also the provision of an automatic level regulation. In order to avoid stagnant zones, in further development of the invention flow-deflecting devices can be provided in the receiving container.

BRIEF DESCRIPTION OF THE DRAWINGS

The invention will now be further described, by way of example, with reference to the accompanying drawing, wherein.

DESCRIPTION OF PREFERRED EMBODIMENTS

Figure 2:
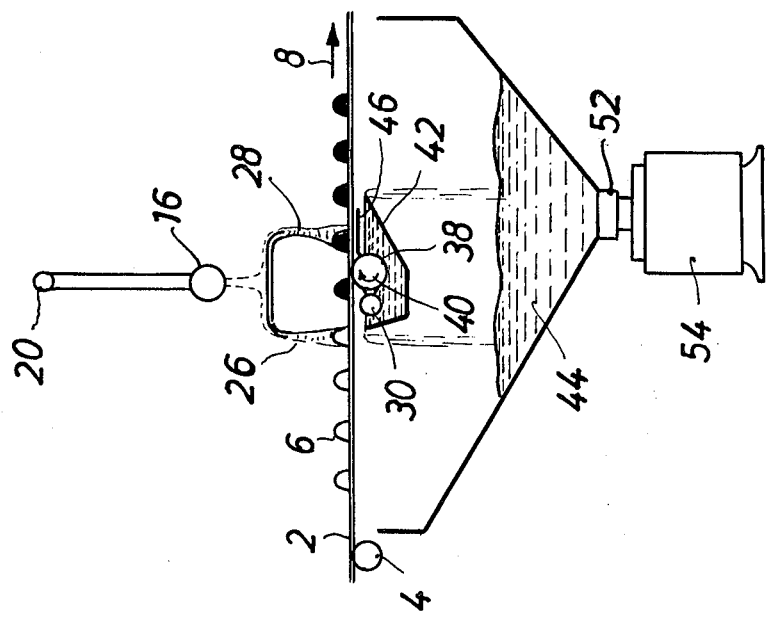
FIG. 1 shows a diagrammatic sectional illustration of an apparatus according to the invention and FIG. 2 shows an illustration rotated through 90° about a vertical axis in relation to FIG. 1.
Figure 1:
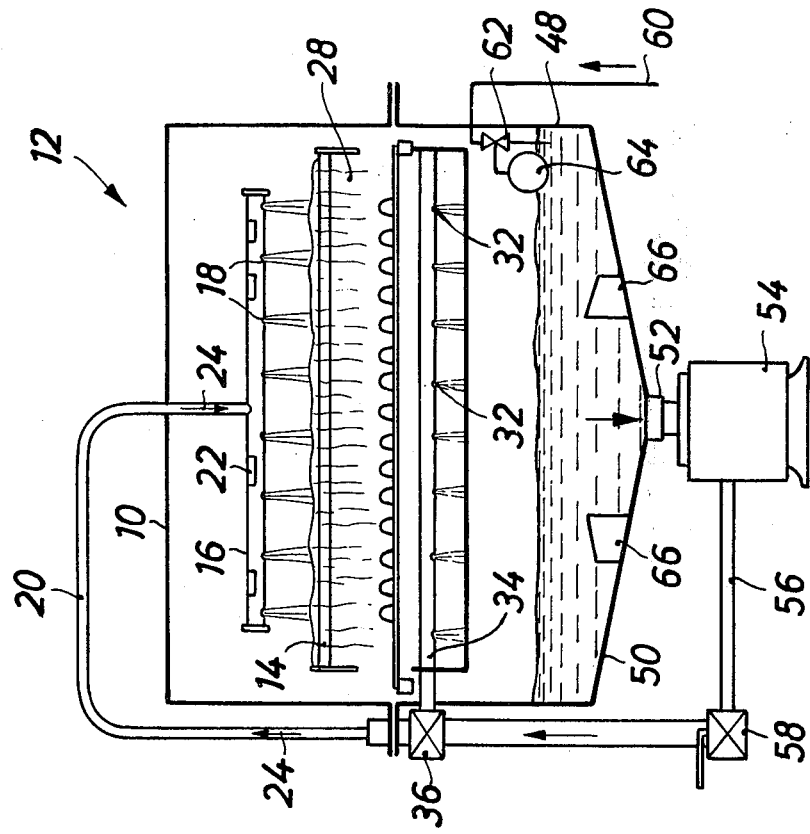

The figures show in diagrammatic illustration a coating apparatus the basic construction for which is similar to the coating machines generally known. A carrier device 2 in the form of a wide-meshed conveyor belt, running over diagrammatically indicated conveyor rollers 4, is conducted with the confectionery pieces 6 situated thereon, which are to be coated with chocolate, in the direction of the arrow 8 through a housing 10. For this purpose corresponding slot are provided in the walls of the housing. This housing and the devices arranged therein together form the processing unit 12 which in the example as described is formed as a coating unit. In the vicinity of the carrier device 2 a veil plate 14, which can be heated, extends over the working width of the housing, and over the veil plate 14 there extends a distributor pressure pipe 16 having downwardly directed nozzles 18, which pipe is fed with composition from a supply conduit 20. Deflector devices 22 in the form of calibrated orifices are provided in the pressure pipe 16 in order to prevent the formation of stagnant zones. The provision of nozzles 18 directly on the ends of the distributor pressure pipe also serves for the same purpose. The composition supplied in the direction of the arrows 24 through the supply conduit 20 and the distributor pressure pipe 16 is under a considerable pressure, for example 2 to 3 atm. exc. Under these circumstances the cross-sections of the nozzles 18 can be made quite small and in the passage through the nozzle openings a brief very heavy shear stressing of the flow of composition occurs. The composition is relieved of stress in the nozzles and after impact upon the veil plate 14 veils 26, 28 of composition are formed which flow down on both sides of the veil plate 14, flowing uniformly and practically without pressure on to the confectionery pieces 6 to be coated. It can be seen that in the embodiment described the nozzles 18 form an outlet system of the distributor pressure pipe 26 which acts upon the entire flow cross-section.

Beaneth the carrier device 2 a second distributor pressure pipe 30 extends over the working width, and nozzles 32 are provided in this second distributor pressure pipe 30 also. The feed of the second pressure pipe 30 takes place through a branch 34 of the supply conduit 20. In the embodiment illustrated a three-way cock 36 is provided at the branching point, by which the supply of the composition can take place optionally to the upper or the lower pressure pipe or to both pressure pipes. The lower or second distributor pressure pipe 30 cooperates in the achievement of a uniform coating on the underside of the confectionery pieces 6. For this purpose beside the second pressure pipe 30 a bottom coating roller 38 is provided which is rotated in the direction of the arrow 40 by a drive device (not shown). The nozzles 32 of the second pressure pipe 30 are directed obliquely downwards on the bottom coating roller 40. The second pressure pipe 30 and the bottom coating roller 40 lie in an overflow container 42 from which the excess composition running from the articles 6 runs off into the lower part of the housing 10, where a reserve 44 of composition can collect. It may been seen that the bottom coating roller 40 entrains a film of the composition from the overflow container 42 and applies it to the underside of the carrier device and thus to the undersides of the articles 6. In order to ensure the desired thin coating, a scraper plate 46 can also be provided which at the same time scrapes off the bottom coating roller 40.

The lower part of the housing 10 forms a collecting container 48 and is provided with oblique walls 50 extending in the manner of a funnel. From the lowest point of the receiving container 48 a return conduit 25 leads to the composition supply conduit 20 so that a closed cycle results. The return conduit consists of the connection piece 52, a delivery pump 54, serving at the same time for increasing pressure, and a connection piece 56 which is connected through a three-way cock 58 to the entry end of the composition supply conduit 20. The three-way cock 58 has the purpose of facilitating the emptying of the system. The pump 54 serving for conveying and pressure increase in an installation of ordinary size can have for example of a delivery output of 3 to 6 tons per hour with a delivery pressure of about 2 to 3 atm. exc. It will be understood that the composition is subjected to a relatively heavy shear stress even in passing through the pump 54. On the other hand, however, in the design of pumps specifically the aim to avoid losses where possible due to internal friction in the liquid is predominant. Specifically in the case of cocoa butter-containing compositions this would be undesirable not only on account of the losses of energy thus occurring but also on account of the then troublesome heating of the composition by which the state of crystallisation would be influenced in an undersirable manner. The desirable feature that the entire composition is placed under a relatively high shear stress very briefly in every circulation, so that despite the heavy stress an unacceptable heating of the composition is avoided, arises in any case not only due to the use of ordinary conveying means such as pumps.

In the embodiments illustrated, for replenishment of the consumed proportions of composition, there is provided a supply device having a supplementing conduit 60 which opens upstream from the pump 54, acting as pressure-raising device, into the cycle, that is in this case into the reserve formed in the composition container 48. The controlling of the quantity issuing from the supplementing conduit 60 takes place with the aid of a valve 62 which is controlled by a float 64 floating on the reserve of composition in the container 48. The delivery output and/or the entry cross-section of the conveying pump 54 can expediently also be controlled by this or another float, in order to ensure stable level conditions in every respect.

Deflector devices 66 can also be provided in the composition container 48 in order to counteract the formation of retarded flow zones.

In order to obtain the most stable possible conditions, both the housing 10 and the pumps 54 and the conduits 52, 56 and 20 can be provided with devices for temperature maintenance, for example with double walls, between which a thermostatically controlled heating medium circulates. Such devices are not illustrated in the figures.

Other embodiments are possibe without departing from the scope of the invention as defined in the claims.

What is claimed is:

1. In a method for coating confectionery articles with a tempered chocolate, comprising the steps of feeding a current of precrystallized, molten tempered chocolate onto a veil plate to produce a downwardly descending substantially pressure-free film of molten chocolate under gravitational force, passing the confectionery articles to be coated through said film, collecting unused chocolate and recirculating said unused chocolate to said current, the improvement consisting of pressurizing said current prior to its being fed to said veil plate to an overpressure of at least one atmosphere and subjecting the current to a brief high shear stress by forcing the current by the aid of said overpressure through at least one nozzle onto said veil plate in said feeding step.

2. The method for coating confectionery articles with a tempered chocolate as in claim 1, wherein the overpressure pressurizing said current prior to its being fed to said veil plate is at least one atmosphere and no greater than three atmospheres.

3. The method for coating confectionery articles with a tempered chocolate as in claim 1, including maintaining the chocolate under conditions which promote the maintenance of a state of crystallization.

4. The method for coating confectionery articles with a tempered chocolate as in claim 3, wherein the chocolate is precrystallized to a viscosity which remains substantially constant with time.

5. The method for coating confectionery articles with a tempered chocolate as in claim 4, in which, to precrystallize the chocolate, the chocolate is heated to a first temperature lying above its highest melting temperature, is cooled down in a first cooling stage to an intermediate temperature of about 30° to about 31° C., then cooled in a second cooling stage to a second temperature of about 28° to 29° C. and thereafter is heated without overheating to a third temperature, the third temperature amounting to about 33° to about 34° C., and in both cooling stages the chocolate is cooled with a cooling medium the temperature of which is only slightly lower than the final temperature of the chocolate in the respective cooling stage.

* * * * *